United States Patent Office 3,472,008
Patented Oct. 14, 1969

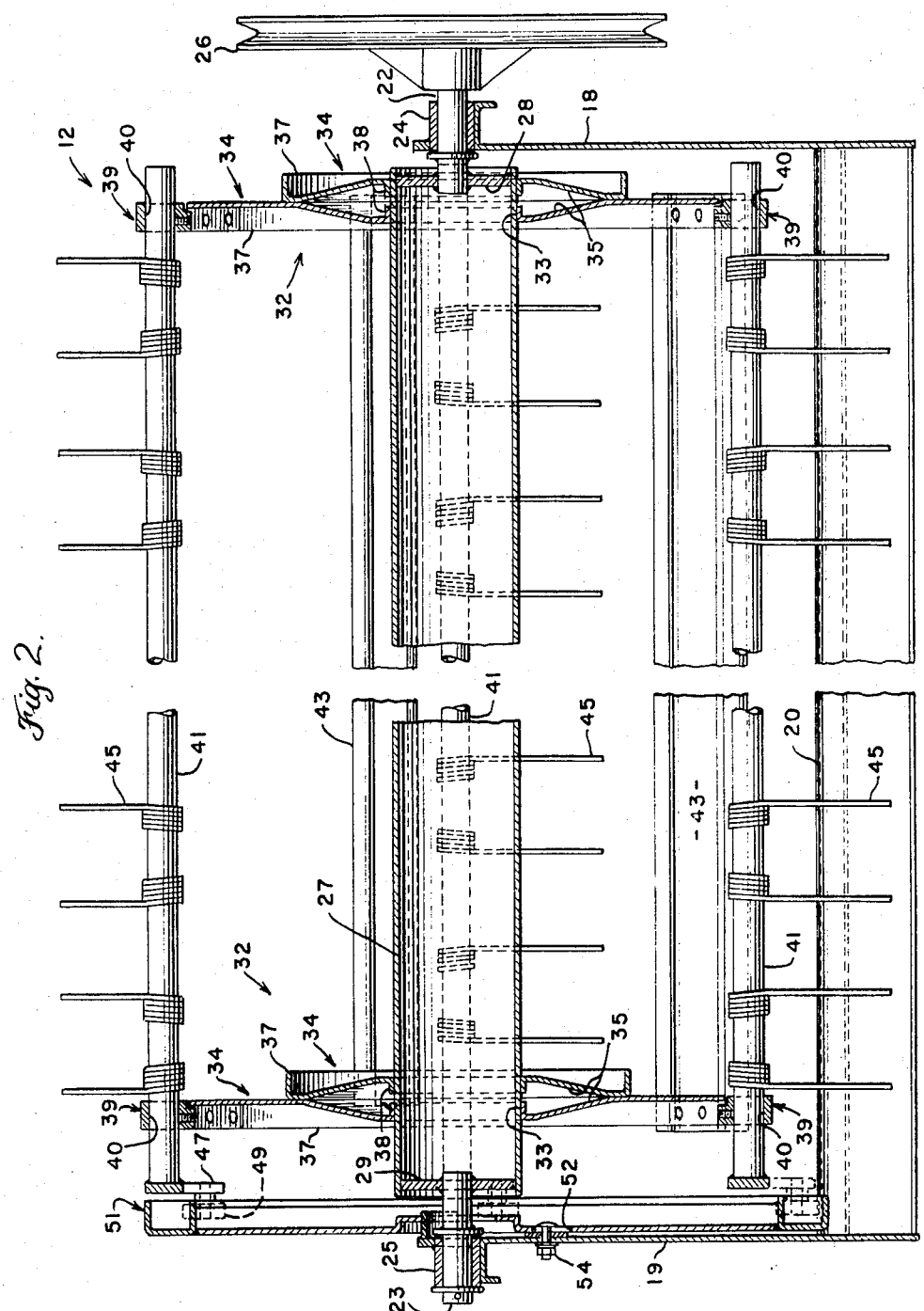

3,472,008
HARVESTER REEL
Joseph C. Hurlburt, Leola, Pa., assignor to Sperry Rand Corporation, New Holland, Pa., a corporation of Delaware
Filed Nov. 14, 1966, Ser. No. 594,022
Int. Cl. A01d 57/02
U.S. Cl. 56—226                                           10 Claims

ABSTRACT OF THE DISCLOSURE

The present invention relates to agricultural machines of the harvester type having adjustable crop gathering headers. More particularly, the invention relates to an improved reel for use on such a harvester header, and to a method for making the reel.

---

Figure 1:
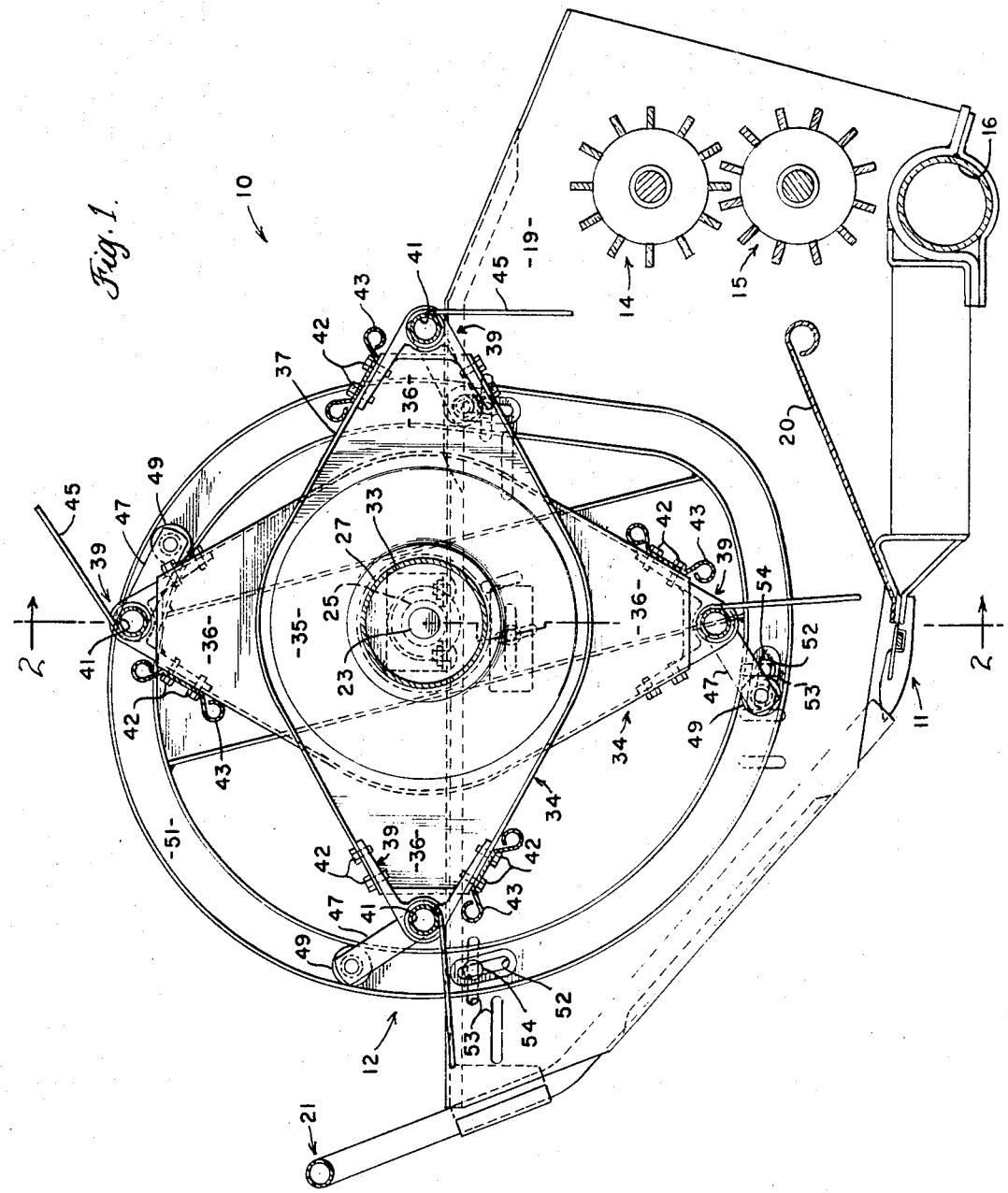

In one class of harvesters, a rotating reel functions at the forward end of the header to feed material into a mower cutterbar and to rake severed material rearwardly into conditioner rolls. In the reel, crop engaging fingers are carried on circumferentially spaced bars which are journalled in two or more axially spaced spiders fixed to the reel axle. The attitude of the crop engaging fingers is controlled by a cam means which rocks the tine bars through a predetermined angle as the reel rotates.

A header reel must operate continuously for long periods of time and must withstand considerable loads imposed by the crop material and by the rocking tine bars. One element of the reel which has caused considerable trouble in the past from the standpoint of wear and stress failures has been the reel spider. It is common, except in extremely long reels, to employ only two spiders which are remotely located relative to each other. It is extremely difficult to assemble and maintain the spiders in true parallel relationship; and under actual manufacturing conditions, it is practical only to assemble the reels with the spiders in approximate parallel relationship.

It has been the practice in the past, due to the stresses involved and the accumulation of the inaccuracies incident to manufacture of the reels, to manufacture reel spiders in the form of relatively heavy circular discs, or from cast elements. The main problem with these prior-art spiders has been in their bulkiness and weight, and in their relatively high costs. Further, in many designs, it is necessary to use more than one type of spider in the same reel; this, of course, increases the tooling costs and costs of manufacture.

Accordingly, it is the principal object of this invention to provide a reel of the type described which is strong enough to withstand the forces involved and is simpler, lighter, and more economical to manufacture than constructions known heretofore.

Another object of this invention is to provide a novel and improved means in a reel for supporting the tine bars and reel bats.

A further object of this invention is to provide a reel spider which is of greatly simplified construction and because of the unique arrangement of the parts can be manufactured at a substantially reduced cost.

A further object of this invention is to provide a reel spider construction which is particularly adaptable for utilization with different numbers of tine bars.

A still further object of this invention is to provide an improved method of making a reel spider.

Other objects of this invention will be apparent hereinafter from the specification and from the recital in the appended claims.

In the drawings:

FIG. 1 is a sectional elevational view of a harvester header illustrating the reel and its relation to the mower and conditioner rolls of the header; and FIG. 2 is a broken-out cross section, taken as indicated by the line 2—2 in FIG. 1, and showing the hub construction of the reel spiders.

Referring now to the drawings by numerals of reference, and particularly to FIG. 1, a harvester header 10 is shown which has been selected as an exemplary mechanism to illustrate the present invention. Header 10 comprises a mower cutterbar 11, a reel 12, and conditioning rolls 14 and 15.

Header 10 is pivotally mounted to a frame element 16 and carries the crop treating elements on a pair of fore-and-aft extending side panels 18 and 19. A guide plate 20 joins the side panels 18 and 19 along their lower edges, and a crop engaging bar 21 extends across the forward end of the header.

Reel 12 comprises a pair of stub shafts 22 and 23 which are journalled respectively in brackets 24 and 25 carried on side panels 18 and 19. A sheave 26 fixed to shaft 22 is operatively connected to drive means, not shown. A cylindrical tube 27 extends between the stub shafts 22 and 23 and is joined to them through a pair of discs 28 and 29 which are welded to the stub shafts and to the tube 27.

A pair of spiders 32 having center bores 33 are carried on cylindrical tube 27, and are fixed thereto by welding or other means. Each spider 32 comprises an identical pair of elements 34 which are assembled at right angles to each other in an opposed relationship, as best shown in FIG. 2. Elements 34 are generally in the shape of a rhombus and are integrally formed with a circular concave center section 35 and a pair of generally triangular radial arms 36 on opposite sides of the center section 35. An upstanding flange 37 extends around the outer periphery of element 34 to give the element rigidity, and an inturned flange 38 abuts against tube 27. When the two elements 34 are joined together, concave center sections 35 form a hollow spider hub having a rim which is generally V-shaped in cross section.

Bearing elements 39 are fixed to the outer ends of radial arms 36 and have apertures 40 for receiving tine bars 41. Fasteners 42 serve to fix bearing elements 39 to the arms 36, and also, as a means for attaching reel bats 43 to elements 34. Crop engaging fingers 45 are carried on tine bars 41, and each of the bars 41 has a crank arm 47 carried on one end. Each of the crank arms 47 carries a roller-type cam follower 49. The followers 49 ride in a channel-shaped cam track 51 which caurses the tines 45 to travel in the desired path as the reel rotates. Cam track 51 is mounted to header side panel 19 and can be adjustably positioned thereon by means of slots 52 and 53 and fasteners 54.

The method of making reel spiders 32 is an important feature of this invention. The method comprises the steps of: cutting a series of generally diamond-shaped blanks from sheet metal stock, drilling the center holes and bearing element mounting holes in the blanks, and then placing the blanks in suitable dies to form the concave center sections 35 and flanges 37 and 38. A pair of elements 34 are then assembled at right angles and in an opposed relationship and joined together by welding, or by other means. Bearing elements 39 are mounted on each of the radial arms 36 to complete the spider. One of the main advantages of applicant's method is that one single die-formed element (element 34) can be used to make all of the spiders in a reel. Thus, only one set of dies is needed, and the assembly of the spiders is substantially less complicated.

It will be apparent from the foregoing description that many advantages result from the disclosed reel construction. Most notable of these advantages is the improved spider construction. Spiders 32, which are formed from identical elements 34 are extremely strong and resistant to stress failures; further, it has been found that a spider of the disclosed design can be produced from approximately one-third of the stock material required to produce a conventional circular spider. Triangularly shaped radial arms 36 provide a strong and convenient means for mounting the reel bats 43.

Elements 34 can, of course, be shaped differently, if it is desired to produce a reel having a different number of tine bars. For example, if a six bar reel were desired, the reel spider would be formed by overlaying and joining two elements in the shape of equilateral triangles. In this arrangement, the center section would be in the shape of a hexagon and the radial ends would be triangularly shaped, as in the disclosed design.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the are to which the invention pertains.

Having thus described my invention, what I claim is:

1. A harvester reel adapted for rotation about a horizontally extending axis comprising, in combination, a plurality of spiders spaced along said axis, a plurality of axially extending and circumferentially spaced tine bars rockably mounted in said spiders, and a plurality of axially extending and circumferentially spaced reel bats fixed to said spiders, said spiders comprising a pair of elements, each of said elements having a center section, radial arm means extending outwardly of said center section and a flange portion extending about the periphery of said element, said spider center sections being joined together forming a hub encircling said axis and said arm means of each element being disposed in a position generally intermediate the respective arm means of the adjacent element to which said element is joined.

2. A harvester reel, as recited in claim 1, wherein said elements have identical configurations and said reel bats are fixed to the flange portions of each of said elements.

3. A harvester reel, as recited in claim 1, wherein said center section, said radial arm means and said flange portion are integral portions of said element and said flange portion extends transversely outwardly of said element.

4. A harvester reel, as recited in claim 1, wherein said center sections are generally circular, the radial arm means in each of said elements consists of a pair of diametrically opposed generally triangularly-shaped sections arranged on opposite sides of the center section, said triangularly-shaped sections are equally spaced from each other circumferentially, and one of said tine bars is supported in each of said triangularly-shaped sections.

5. A harvester reel, as recited in claim 1, wherein a hollow cylindrical tube extends through the hubs of said spiders, and a pair of stub shafts are fixed to opposite axial ends of said tube for rotatably supporting said reel.

6. A harvester reel, as recited in claim 1, wherein cam means is provided for rotating said tine bars through a given angle to regulate the positions of said fingers.

7. A harvester reel, as recited in claim 1, wherein each of said center sections has a concave portion formed therein, said concave portions are in an opposed relationship and directly opposite each other so each of said hubs has a generally V-shaped cross section along its outer periphery.

8. In a harvester reel, a spider adapted to rotate about an axis passing through the reel axle and comprising a pair of identical elements, each of said elements including a concave center section and a plurality of radial arms extending therefrom, and a flange portion extending about the periphery of said element, each of said radial arms having a relatively wide base portion adjacent said center section and a relatively narrow section radially outward from said base portion, said elements being joined together at said concave center sections, said sections being directly opposite each other and with the respective radial arms equally spaced apart around the periphery of the spider.

9. In a harvester reel, as recited in claim 8, wherein each of said center sections is generally circular, said flange portion extends transversely outwardly of said center section and said radial arms, and said arms extend from said center section generally bisecting a pair of adjacent arms on the opposite spider element to which it is joined.

10. In a harvester reel, as recited in claim 8, said concave portions being directly opposite each other and in an opposed relationship to form a hollow spider hub which encircles said axis when said elements are joined together.

References Cited

UNITED STATES PATENTS

| 270,336 | 1/1883 | Pulver | 56—226 |
|---|---|---|---|
| 209,047 | 10/1878 | Hodges et al. | 56—221 |
| 868,788 | 10/1907 | Lait | 56—223 |
| 1,215,916 | 2/1917 | Czárán | 56—222 |
| 1,290,407 | 1/1919 | Terry | 56—220 |
| 1,402,360 | 1/1922 | Holstein et al. | 56—222 |
| 2,694,894 | 11/1954 | Linshed | 56—226 |
| 2,939,263 | 6/1960 | Huber | 56—226 |

F. BARRY SHAY, Primary Examiner

P. A. RAZZANO, Assistant Examiner

U.S. Cl. X.R.

56—1